United States Patent [19]

Marquez et al.

[11] Patent Number: 5,052,288

[45] Date of Patent: Oct. 1, 1991

[54] APPARATUS FOR DISPENSING SNACK FOODS

[75] Inventors: Al H. Marquez, San Jose; James A. Way, Cupertino; G. Mark Remelman, Fremont, all of Calif.

[73] Assignee: Hot Snacks, Inc., San Jose, Calif.

[21] Appl. No.: 565,944

[22] Filed: Aug. 9, 1990

Related U.S. Application Data

[62] Division of Ser. No. 426,104, Oct. 24, 1989.

[51] Int. Cl.⁵ ........ A47J 37/12

[52] U.S. Cl. ........ 99/407; 99/403; 222/368

[58] Field of Search ........ 99/403, 404, 407, 408, 99/409, 357, 494; 222/349, 350, 368

[56] References Cited

U.S. PATENT DOCUMENTS

| | | | |
|---|---|---|---|
| 803,288 | 10/1905 | Hunt | 222/350 |
| 1,484,506 | 2/1924 | Killian | 222/368 |
| 2,715,246 | 8/1955 | Van Doorn | 222/368 |
| 3,231,105 | 1/1966 | Easley, Jr. | 222/368 |
| 3,870,199 | 3/1975 | Dugger et al. | 99/494 |
| 4,231,495 | 11/1980 | Lund | 222/368 |
| 4,359,935 | 11/1982 | Murray | 99/357 |
| 4,428,280 | 1/1984 | Williams et al. | 99/356 |
| 4,586,429 | 5/1986 | Hawkins | 99/407 |
| 4,677,278 | 6/1987 | Knoll | 219/214 |
| 4,722,267 | 2/1988 | Galockin et al. | 99/357 |
| 4,748,902 | 6/1988 | Maurantonio | 99/357 |
| 4,838,455 | 6/1989 | Hoeberigs | 99/348 |
| 4,919,071 | 4/1990 | Gatti | 222/368 |

FOREIGN PATENT DOCUMENTS

| | | | |
|---|---|---|---|
| 2600262 | 7/1976 | Fed. Rep. of Germany | 222/349 |
| 2902853 | 10/1979 | Fed. Rep. of Germany | 222/350 |
| 8912417 | 12/1989 | PCT Int'l Appl. | 99/407 |

OTHER PUBLICATIONS

Ore-Ida Vended Products, Inc. Product Information Brochure on French-Fry Vending Machine, Nov. 87.

*Primary Examiner*—Timothy F. Simone
*Attorney, Agent, or Firm*—Blakely, Sokoloff, Taylor & Zafman

[57] ABSTRACT

A food product dispensing apparatus and method which prevents the product from being damaged when the product is dispensed. A food product cooking apparatus and method which preserves the cooking oil such that the oil needs only be changed at two to four week intervals. The present apparatus and method relates to vending-frying machines for dispensing and cooking food products. The instant invention extends the intervals between when such vending machines need be serviced.

15 Claims, 6 Drawing Sheets

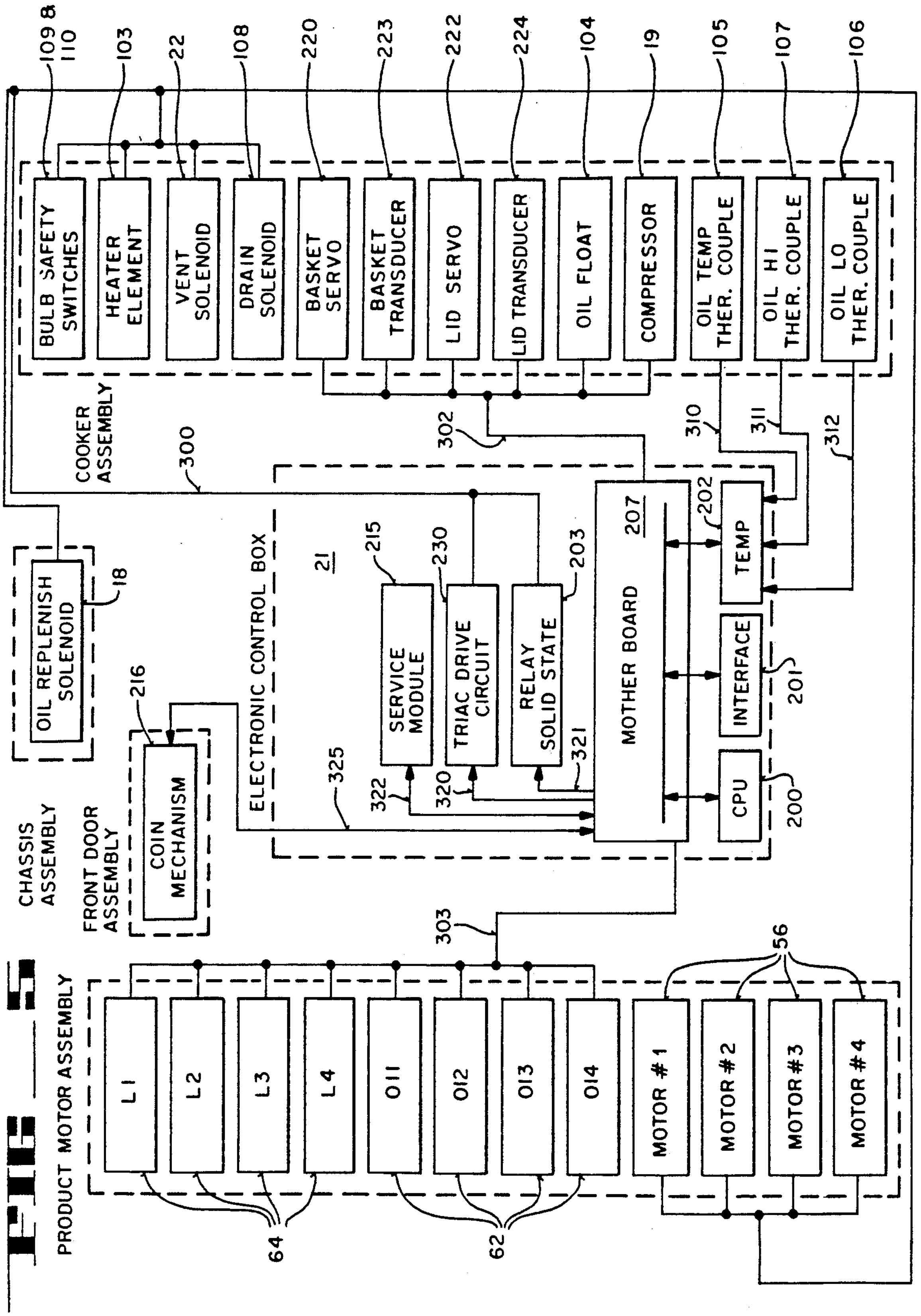
FIG 5
PRODUCT MOTOR ASSEMBLY
CHASSIS ASSEMBLY
FRONT DOOR ASSEMBLY
COOKER ASSEMBLY
ELECTRONIC CONTROL BOX
21
BULB SAFETY SWITCHES
HEATER ELEMENT
VENT SOLENOID
DRAIN SOLENOID
BASKET SERVO
BASKET TRANSDUCER
LID SERVO
LID TRANSDUCER
OIL FLOAT
COMPRESSOR
OIL TEMP THER. COUPLE
OIL HI THER. COUPLE
OIL LO THER. COUPLE
109 & 110
103
22
108
220
223
222
224
104
19
105
107
106
300
302
310
311
312
OIL REPLENISH SOLENOID
18
COIN MECHANISM
216
325
SERVICE MODULE
215
TRIAC DRIVE CIRCUIT
230
RELAY SOLID STATE
203
322
320
321
MOTHER BOARD
207
TEMP
202
INTERFACE
201
CPU
200
303
L1
L2
L3
L4
O11
O12
O13
O14
MOTOR #1
MOTOR #2
MOTOR #3
MOTOR #4
56
64
62

APPARATUS FOR DISPENSING SNACK FOODS

This is a divisional of application Ser. No. 07/426,104, filed Oct. 24, 1989.

FIELD OF THE INVENTION

This invention relates to the field of cooking methods and, more particularly, to vending machines which fry certain snack foods on demand by a consumer.

BACKGROUND OF THE INVENTION

There are known in the prior art certain vending machines which fry a food product upon demand by a consumer and dispense that product to the consumer once the frying has been completed. Typically, a consumer will insert his money and select a product. The machine will then cook the product, and serve it to the consumer.

Many vending machines which are currently in use fry food products in much the same way as a commercial frying machine does in a restaurant. Restaurant fryers employ heating coils which are immersed in cooking oil. The cooking oil is continuously kept at a high temperature while remaining exposed to the air. The food product is placed in a basket which is then lowered into the oil for cooking. After frying the food for a specified length of time, the food is removed and drained of any excess oil.

In restaurants which serve fried foods, the oil is changed on a regular basis. This changing is necessary because after numerous cooking cycles, the oil alters the flavor of the food product as a result of its being cooked. In addition, after being exposed to the air and kept at a high temperature, the oil breaks down chemically and ceases to perform its frying task properly. The vending machines which serve fried foods are similarly constrained by the longevity of the oil. This requires that maintenance be frequently performed on the machines. For example, prior art vending machines require that the oil in these vendor/fryeres be changed on a weekly basis to circumvent these problems.

Further, the past dispensing method for machines of this type have had several drawbacks. Sometimes, these machines dispense and fry a food "half product." The term "half product" refers to a pre-cooked, pasta-like food product which, when subsequently fried in oil, develops a cracker-like consistency. The dispensers in previous machines have relied on an auger-type mechanism wherein the auger turns to dispense an adequate amount of the product for frying. The half product comes in various forms and shapes, and frequently the auger mechanism breaks and separates many of the half product pieces during the dispensing process. A consumer generally desires to have a fully formed and unbroken product.

As will be seen, the instant invention solves both the dispensing and the cooking oil problems characteristic of the prior art. The dispensing apparatus and method of the invented vending machine releases the product in such a way that the product is not damaged in any way prior to cooking. Also, the cooking oil is stored in the machine such that exposure to the air is minimized, resulting in little decomposition of the oil between machine service calls. The unique cooking operation described here wherein the oil is forced from the heating chamber into the cooking pan utilizing air pressure makes this possible. As a result the oil does not need to be changed for long periods of time.

Moreover, the cooking temperature in the oil chamber of this invention is precisely controlled so that the product can be cooked almost instantaneously during high demand periods. The temperature is correspondingly reduced during low demand periods which further increases oil longevity.

The foregoing advances in the state of the art embodied in this invention has extended oil life from the one week period typical of the prior art to a two-to-four week period. This increased oil longevity means that the machine does not need to be maintained as often. The instant invention is a significant advancement of the prior art because lower maintenance translates into increased profits to the vendor.

SUMMARY OF THE INVENTION

An apparatus for dispensing and frying a food product is described. The dispenser portion of the invention is comprised of a bin which contains the food product, a "paddle wheel" with a motor to drive it for scooping a plurality of food products out of the bin, and a flange which compresses the paddle wheel as it is rotated to dispense the products.

The frying portion of the invention is comprised of a cooking pan connected to a oil heating chamber which keeps the cooking oil constantly at cooking temperature except during certain low demand periods as determined by the vendor. The heating chamber is comprised of heating coils and sensors which signal the control unit to add or drain oil as required. During a cooking operation, air pressure inside the oil heating chamber is increased so that the oil level rises through a vertical column which extends from the cooking pan into the lower portion of the heating chamber, flooding the attached cooking pan. The oil thus submerges a cooking basket which is in the pan containing the food product and fries it.

BRIEF DESCRIPTION OF THE DRAWINGS

FIG. 5 is a block diagram of the control circuit and its connections to the components of the apparatus.

DESCRIPTION OF THE PREFERRED EMBODIMENT(S)

The present invention is an apparatus and method for dispensing and frying food products. In the following description, numerous specific details such as materials, dimensions, etc. will be set forth in order to provide a thorough understanding of the present invention. It will be obvious, however, to one skilled in the art, that these specific details may not be required to practice the present invention.

Figure 1:
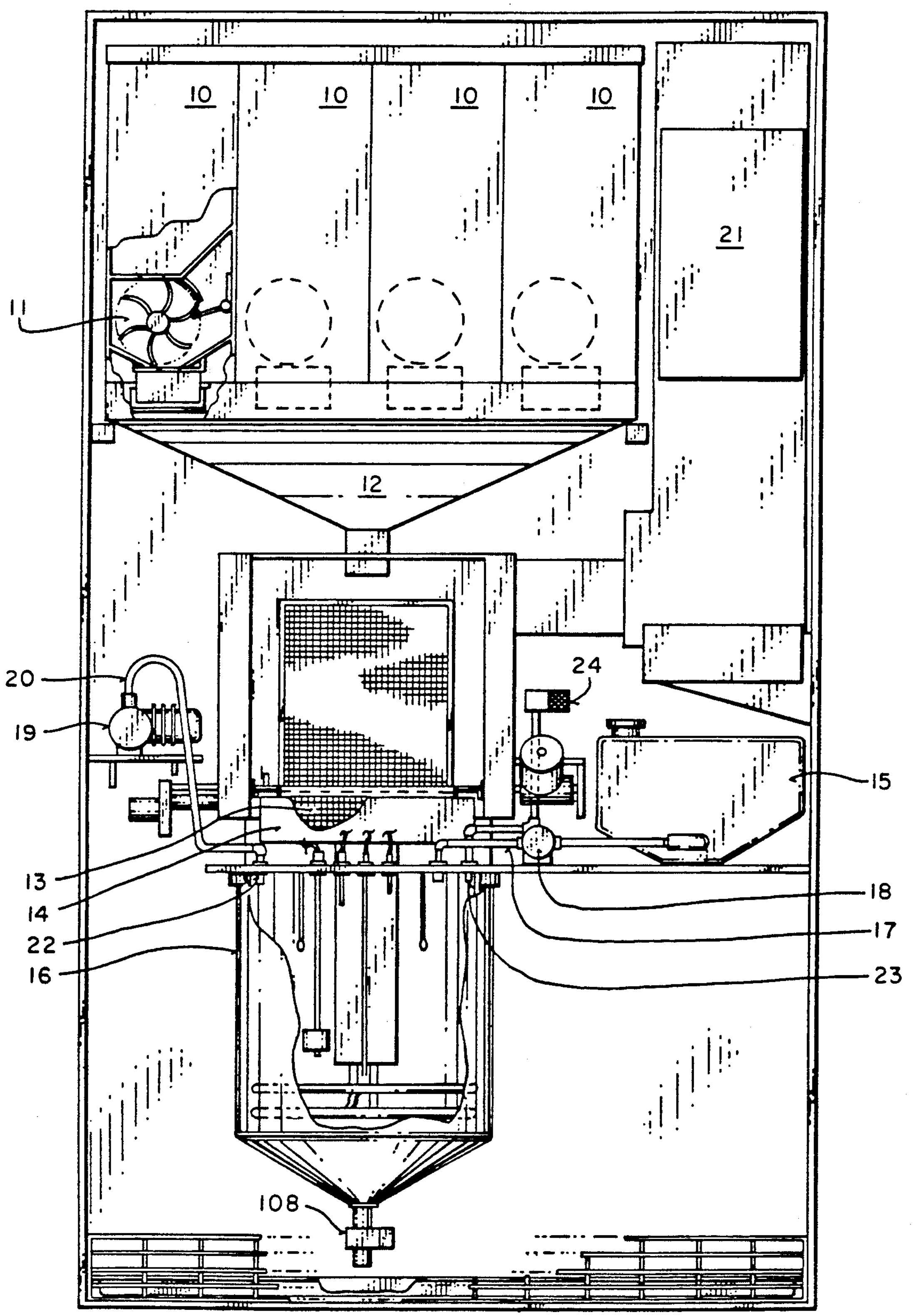
FIG. 1 is an illustration of the interior of the presently invented vending machine showing the dispensing mechanism the fryer, the reservoir for the make-up oil, the oil heating chamber and the control unit.

In the preferred embodiment of the apparatus and referring to FIG. 1, there are four bins 10 which each contain separate dispenser mechanisms 11. When a consumer has inserted his money and selected a food product to purchase, the control unit 21 signals the appropriate dispenser that the consumer has made a food product selection. Numerous references to control unit 21 will be made throughout this description, and a detailed description of its operation and connections in the apparatus will be discussed later.

Generally, each bin may contain a different flavor and/or design of food product. One such dispenser 11 is shown in a cutaway view. Each of the bins 10 releases a measured amount of food product through a bottom opening into a chute 12 which lies directly below bins 10. Chute 12 is tapered along its sides so that the food product, when released from any given bin for cooking, will be directed into cooking basket 13. At the time of dispensing, cooking basket 13 rests beneath chute 12 and inside cooking pan 14. Note that the wire screen lid of basket 13 is shown in its lifted position so that basket 13 can accept food product. Once food product is dispensed into basket 13, this lid closes to contain the cooking process.

Figure 2:
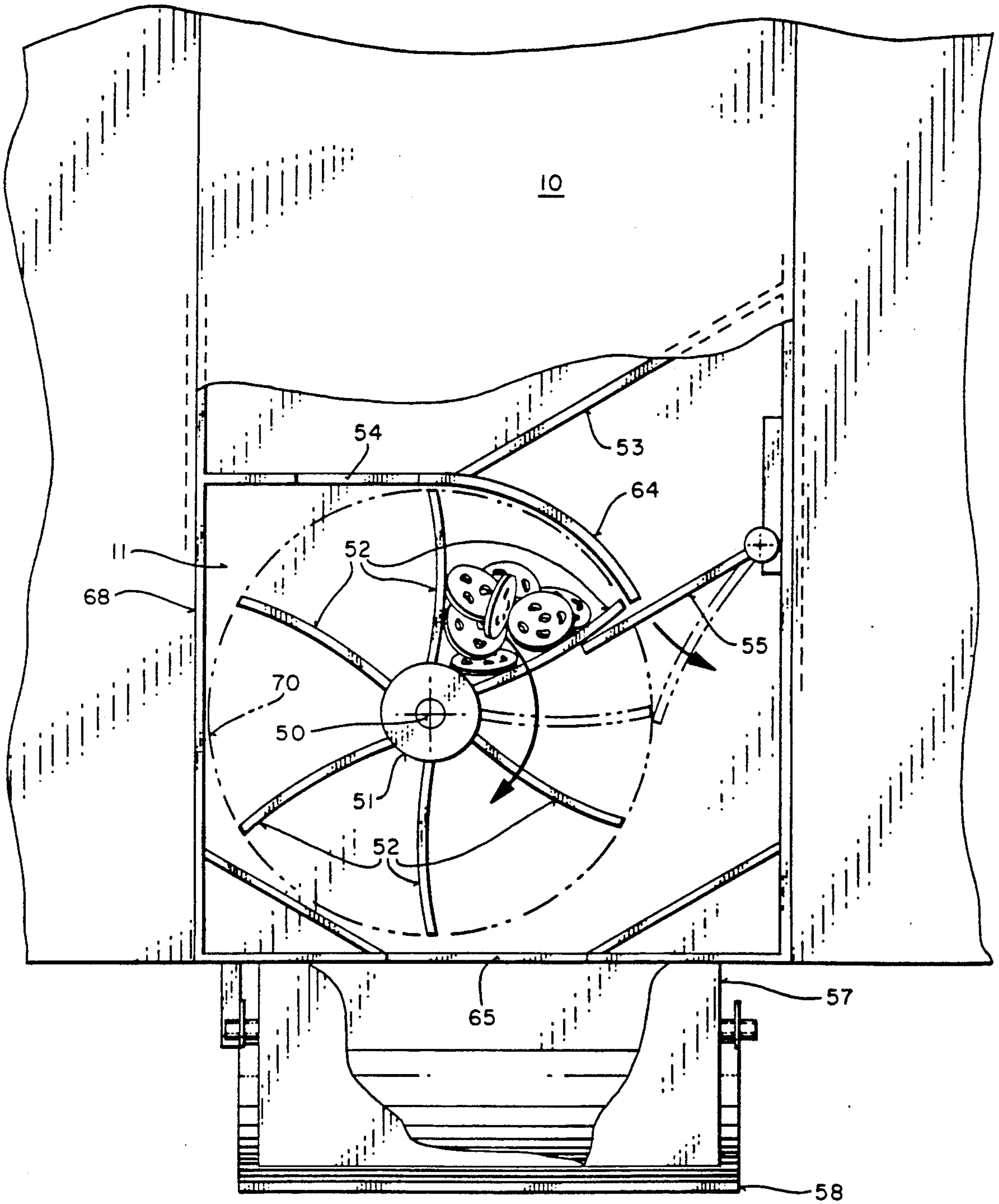
FIG. 2 is a front view of a bin with a cutaway view of the dispenser mechanism. This illustrates the paddle wheel and flapper mechanisms.

Referring to a detailed drawing of dispenser 11 in FIG. 2, notice that it is comprised primarily of paddle-wheel 70. Paddle-wheel 70 is rotatably mounted across opposite sidewalls of the interior of dispenser housing 68. There it can rotate freely about its axis during normal operation. In this embodiment, paddle-wheel 70 rotates in the clockwise direction as viewed from the front of FIG. 2. Paddle-wheel 70 has spokes 52 radiating out from its center, shaft 50. Spokes 52 comprise planar flanges made of a pliable material, such as rubber or plastic, which are attached to shaft 50. Shaft 50 is rotatably affixed to the interior of meter housing 68, in the preferred embodiment, by inserting one of its ends through an aperture in the front of dispenser housing 68. A ring 51 holds shaft 50 in place and is affixed around the aperture on the exterior of dispenser housing 68 thereby allowing shaft 50 to rotate freely. As shown on FIG. 3, shaft 50 and each of the spokes 52 extend completely across the width of dispenser housing 68. This means that food product will always be confined by pairs of adjacent spokes 52. The separation between adjacent spokes 52 and the width of the dispenser housing 68 defines a measured amount of food product which gets dispenses with each turn of paddle-wheel 70. Additional amount of food product enter dispensing unit 11 through aperture 54 only when paddle-wheel 70 is rotated.

With reference again to FIG. 2, dispenser housing 68 includes a shunt 53 and an aperture 54. Aperture 54 provides an opening so that food product can enter into dispenser 11 from bin 10. This allows product to flow from bin 10 into the path of paddle-wheel 70 when the wheel is turning.

Dispenser unit 11 also comprises a flapper 55 affixed to the interior of dispenser 11. Preferably, flapper 55 is constructed of similar material as are spokes 52 and it is mounted so that it is in the path of each spoke 52. When paddle-wheel 70 is rotated clockwise, food product falls out of the storage portion of the bin through aperture 54, to fill the separate dispensing chambers defined by adjacent spokes 52. During rotation of the paddle-wheel, the food product is kept between two adjacent spokes 52 by partition 64 which is curved to correspond with the circumference of paddle-wheel 70.

To better understand the dispensing mechanism of the invented vending machine consider a sample dispensing operation. During dispensing, as shown in FIG. 2, each spoke 52 rotates carrying along a measured amount of food product along with it. When the leading spoke 52 contacts the extended portion of flapper 55, it is forced back toward its adjacent spoke. The magnitude of the force, of course, is dependent upon the length of the flapper 55, its relative pliability or rigidity, and the pliability or rigidity of the spokes 52. As the spokes 52 are compressed toward each other, the food product is reoriented. Assuming the food product is flat (as is a food product typical to this type of apparatus), this compressing action orients the product so that the food product pieces now lie flat, on top of one another and generally in the approximate plane of adjacent pairs of spokes 52. As a result of this orienting process, the food product pieces are prevented from being crushed or broken when they are released from spokes 52 and fall through aperture 65. In addition, the pliability of spokes 52, and the compressing action by flapper 55 allows the product to remain undamaged in any way prior to being dispensed. When flapper 55 releases each spoke 52, which contains food product held by it and its adjacent spoke, the food product is dropped through aperture 65 and into chamber 57, the lower portion of dispenser 11. This allows a measured portion of undamaged food product to be dispensed into chamber 57 from paddle-wheel 70.

Figure 3:
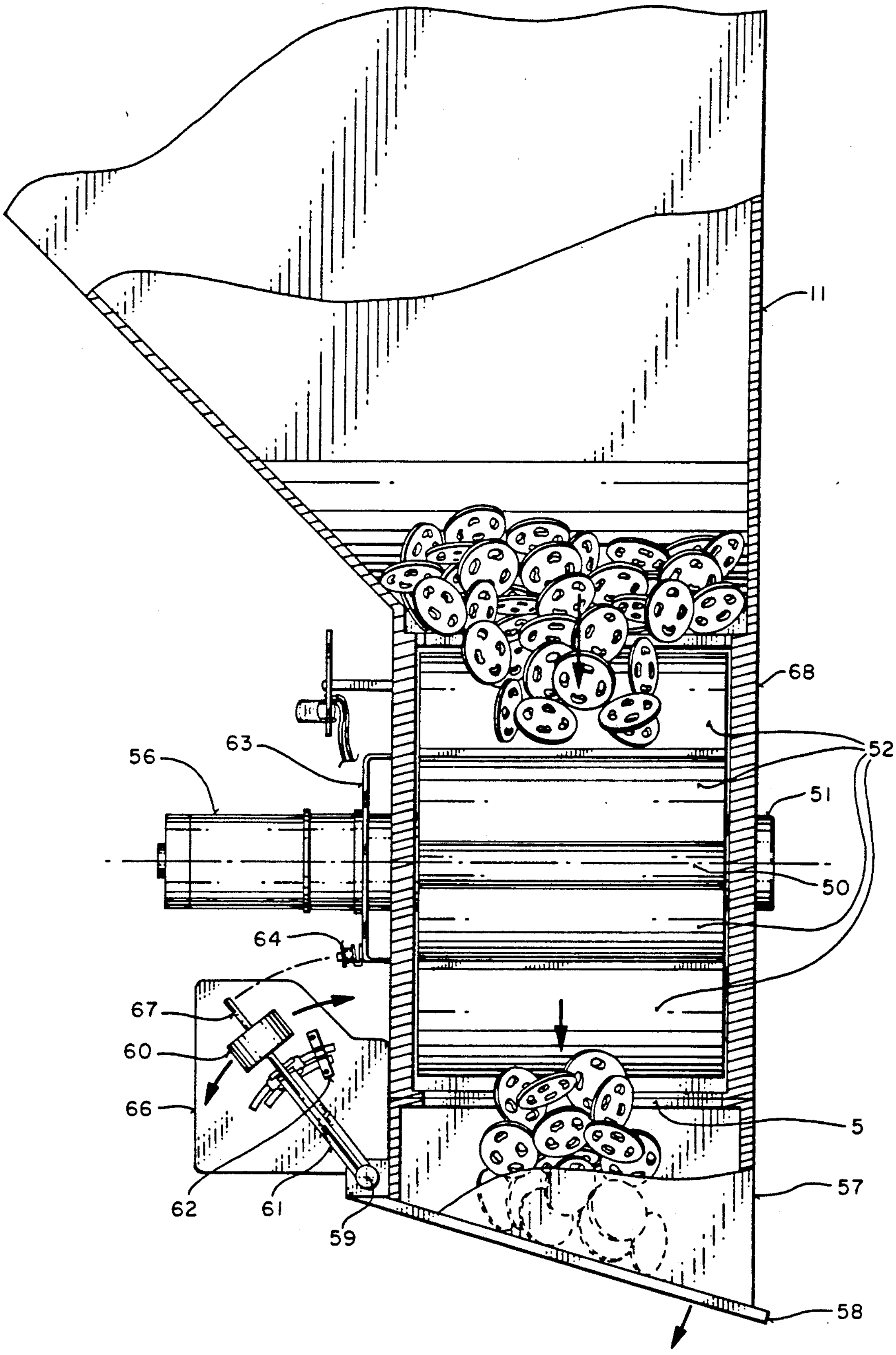
FIG. 3 illustrates a side view of the dispenser mechanism showing the motor which drives the paddle wheel, the bin and weight platform mechanism and the counterweight which attaches to the weight platform and releases product upon initiation of a vend cycle.

As shown of FIG. 3, the rear of paddle-wheel 70 is attached to and driven by motor 56. Motor 56, in the preferred embodiment, is affixed to the rear of the bin via bracket 63. Motor 56 is attached to and rotates shaft 50 directly. When paddle-wheel 70 turns, as shown in FIG. 3, food product falls through aperture 65 into chamber 57. The food product then comes to rest against a weight platform 58 at the bottom of chamber 57.

Weight platform 58 is attached to dispenser housing 68's rear by hinge 59. As shown in FIG. 3, arm 61 is attached to hinge 59 such that it rotates in the clockwise direction when the door is opened. Counterweight 60, an ordinary cylindrical weight, is attached to the outwardly protruding end of arm 61. Counterweight 60 has a threaded aperture through its center. Since the end of arm 61 is also threaded, counterweight 60 is thereby affixed to the end of arm 61. By threadably rotating counterweight 60, it is possible to adjust the position of counterweight 60 up and down along arm 61. This makes it possible to adjust the amount of force exerted by the counterbalancing action of counterweight 60 to keep weight platform 58 closed. Since weight platform 58 will open when the weight of food product resting on the door exceeds the force exerted by counterweight 60, the user can, in this manner, set each bin according to the weight of the particular food product to be dispensed from chamber 57.

When weight platform 58 opens by the weight of food product resting on it, it is held open for a short period of time by an electro-magnet 64, affixed to the rear of the bin 11. Electro-magnet 64 is mounted on bin 11 so that it lies at the apogee of arm 61's path. So, when electro-magnet 64 is activated and arm 61 swings upward, arm 61 is held up by its end 67, keeping weight platform 58 open. Electro-magnet 64 is activated by control circuit 21 at the same time that the control circuit activates one of the dispenser motors 56. Electro-magnet 64 is activated for a brief period of time to allow all product sitting in chamber 57 against weight platform 58 to be released.

The dispensing mechanism also includes switch 62 affixed to bracket 66. Bracket 66 is attached to the rear of and perpendicular to dispenser 11. In the preferred embodiment, switch 62 is situated on bracket 66 so that it lies in the path of arm 61 when weight platform 58 is opened. Switch 62 is mounted on bracket 66 so that when weight platform 58 is opened, arm 61 rotates clockwise and triggers switch 62.

When the weight of the food product resting on weight platform 58 reaches the level as set by counterweight 60, weight platform 58 is opened. This opening triggers switch 62 thus signalling control circuit 21 (see FIG. 5) that the dispensing operation has started. Electro-magnet 64 then holds weight platform 58 open for a short period of time to allow all of the product to fall out of chamber 57. Control circuit 21 will then start the cooking operation. At this point, food product falls out of chamber 57 of dispenser 11, slides down chute 12, and ends up in basket 13 where it is ready for frying.

Referring back to FIG. 1, the cooking oil for frying initially resides in a supply reservoir 15. Reservoir 15 is situated higher in the machine than oil heating chamber 16. Oil is supplied from reservoir 15 to heating chamber 16 along supply hose 17. Supply hose 17 is connected at one end to the bottom of reservoir 15, and at the other to the top of heating chamber 16. Since reservoir 15 is higher in the machine than chamber 16, a gravity feed for supply oil is thus accomplished through hose 17 from reservoir 15 to heating chamber 16. Flow is regulated through hose 17 by an electronically controlled valve 18 coupled in series with hose 17.

Generally, heated oil resides in heating chamber 16 during normal operation of the invention. Heating chamber 16 is essentially air-tight except for vent valve 24 connected to chamber 16 and shaft 100 (discussed below), which supplies oil to cooking pan 14. Therefore when air pressure is increased in heating chamber 16, heated oil will flow up through and out of shaft 100 into cooking pan 14 to fry food product sitting in basket 13. A detailed discussion of the process follows. To seal the chamber at cooking time, an electronic vent valve 24 can be closed. Vent valve 24 is connected to the top of chamber 16 via hose 23.

Referring again to FIG. 1, air pressure in the heating chamber may be increased via air compressor 19. Air compressor 19, in this embodiment, is connected to heating chamber 16 via an air pressure hose 20 and aperture 22 in the top of heating chamber 16. Air compressor 19 is controlled by control unit 21. This increasing of the air pressure in heating chamber 16 is the first step in the cooking operation.

Figure 4:
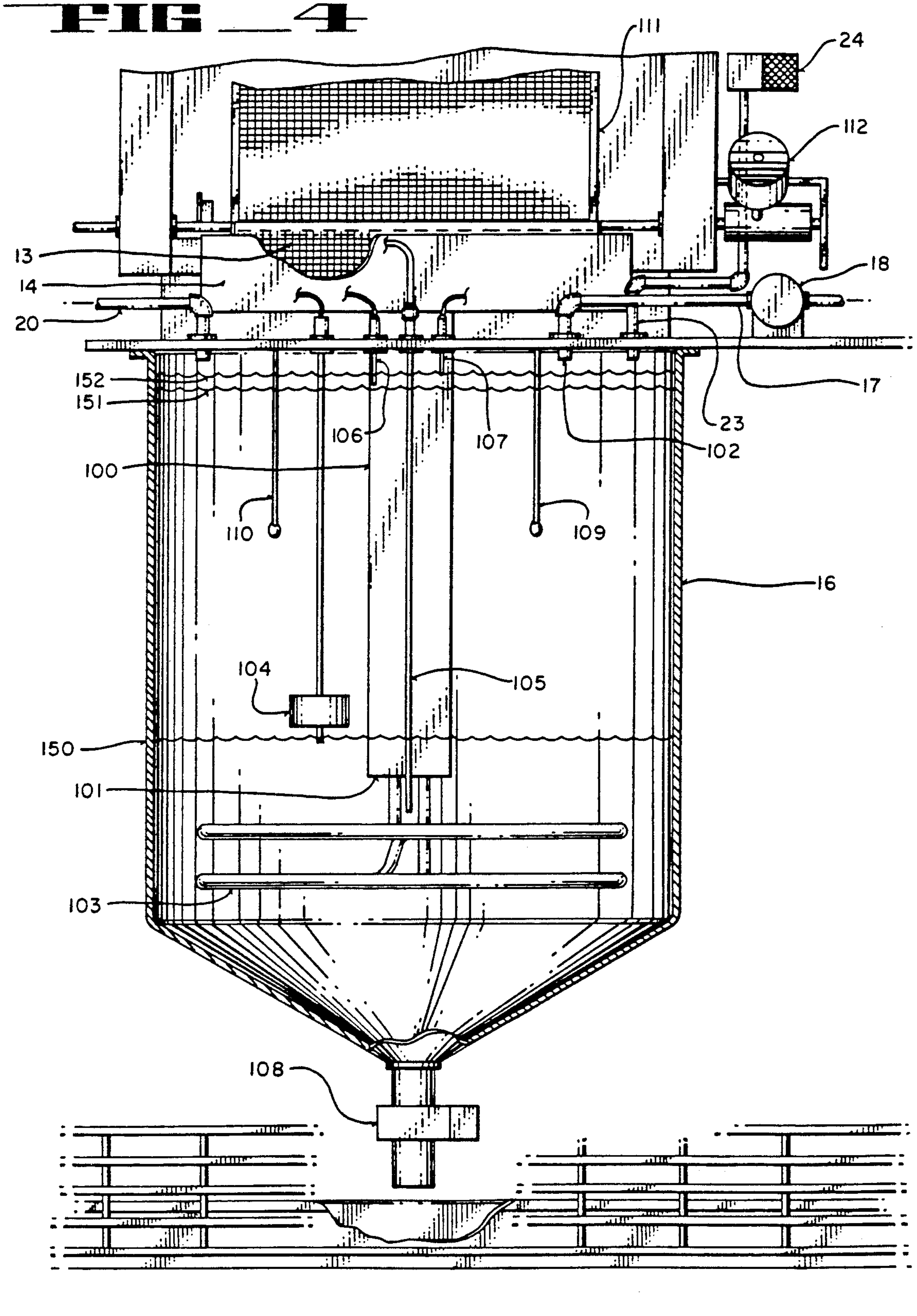
FIG. 4 is a detailed illustration of the component parts of the heating chamber.
Figure 6:
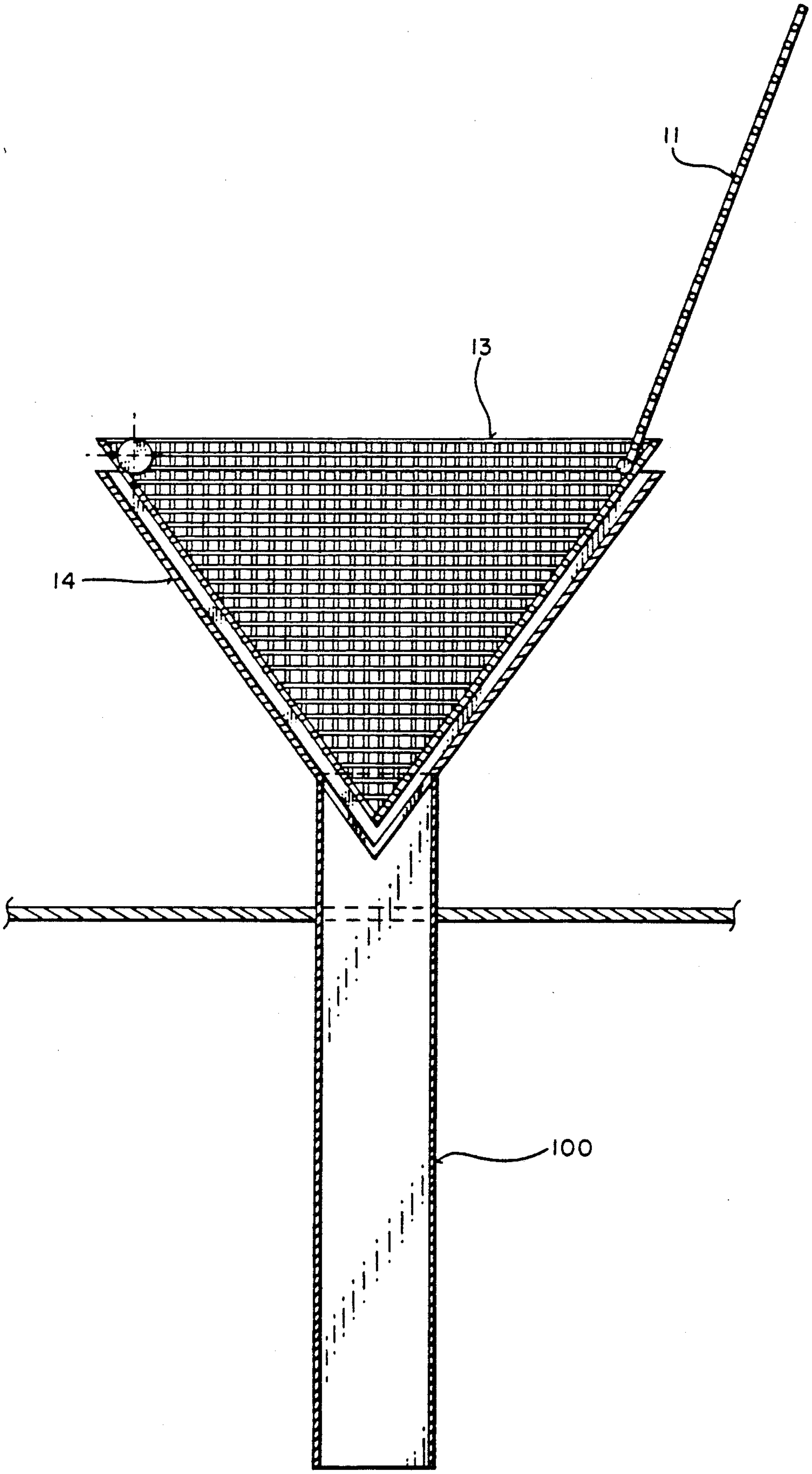
FIG. 6 is a side view showing the cooking pan and cooking basket.

Referring to FIG. 4, heating chamber 16 lies directly beneath cooking pan 14. Cooking pan 14 is attached at its bottom to a hollow shaft 100, which extends into the lower portion of heating chamber 16. Cooking pan 14, and cooking basket 13 are generally parallel in shape when viewed from the front, but triangular if viewed from the side, as shown on FIG. 6. During operation of the apparatus, bottom opening 101 of shaft 100 is submerged in heated cooking oil in chamber 16 since oil level is maintained approximately at oil level 151. Since heating chamber 16 is essentially air-tight except for shaft 100's connection to pan 14, when pressurized air is injected into chamber 16 via line 20, the oil rises through shaft 100 into pan 14. The unique shape of pan 14, and basket 13, as shown on FIG. 6, allows the oil to flow freely in and out of the pan during operation.

Oil level, temperature and machine status is controlled and monitored by control unit 21. Proper oil level is maintained in chamber 16 in the following way. Referring to FIG. 4, before chamber 16 is filled with oil, heating coils 103 are not activated. Control unit 21 starts filling chamber 16 by opening valve 18. This lets oil flow through hose 17 from reservoir 15 into chamber 16. The rising oil level in the chamber is detected by minimum level float switch 104 which is triggered when the oil level is approximately at oil level 150. Then, control unit 21 activates the power to heating coils 103. Valve 18 is closed, and the filling of chamber 16 is stopped until the oil temperature reaches user-definable temperature 205° C. as detected by thermocouple 105 ("TC1").

Once the oil in chamber 16 is brought up the full 205° C. cooking temperature, oil is added by opening valve 18 in bursts lasting about two seconds. The bursts continue until the oil level in chamber 16 reaches thermocouple 106 ("TC2") at approximately oil level 151. TC2 106 detects a normal oil level condition. That is, when TC2 106 detects that the heated oil is at oil level 151, heating chamber 16 is at its optimum operating level.

A third thermocouple 107 ("TC3") is used to detect an overfill condition. An overfill condition must be checked so that oil does not overflow heating chamber 16, entering into the cooking pan prematurely and/or flooding the interior of the machine. TC3 107 resides above oil level 151 (detected by TC2 106), and will alert the control unit 21 of an overfill if oil level 152 is reached in two consecutive cooking cycles. TC3 107 may be reached during a normal cooking cycle due to intermittent fluctuations in oil volume when the oil is heated. So, the machine will allow one TC3 alert without an overfill alarm. In this case, valve 108 will be opened briefly, allowing a small amount of the oil in heating chamber 16 to be released. However, if oil level 152 is reached twice in a 20 minute period as detected by TC3 107, control unit 21 turns off heating coils 103, drain valve 108 is opened, and the machine is prevented from initiating any more cooking cycles until it has been serviced.

TC1 105 also detects an overtemperature condition. If the temperature of the heating chamber exceeds 205° C. for a given period of time, as detected by any of these three thermocouples, a shutdown will be initiated by control unit 21, in the same manner as for the overfill condition. As an additional back-up to an overtemperature condition, the power supply to heating coils 103 is interrupted by two capillary bulb switches 109 and 110 wired in series. Both switches are normally closed and will be opened, terminating heating coil power, if the temperature of the oil exceeds a given level. This prevents the machine from operating for a predetermined period of time. If capillary bulb switch 109 detects that the temperature of the oil has exceeded 430° F. for a predetermined period of time then it will open, terminating coil power. Capillary bulb switch 109 is automatically resetting. That is, approximately 15 minutes after the switch has opened, it will reclose so that the machine can resume normal operation. Capillary bulb switch 110, on the other hand, is a manually resetting switch and will be triggered if the oil temperature reaches 450° F. This switch must be manually reset during maintenance by service personnel.

When the consumer inserts the proper amount of money and makes his selection (a "vend"), one of the dispenser mechanisms 11 releases the requisite amount of food product into cooking basket 13 in the manner described above. The triggering of switch 62 from the opening of weight platform 58 as shown on FIG. 3 activates the cooking sequence. Once chamber 16 has been filled and the cooking oil has been brought up to the full operating temperature of 205° C., a cooking sequence can begin. The cooking sequence commences when vent solenoid 22 is closed, sealing chamber 16, and air compressor 19 increases air pressure in oil heating chamber 16. Referring to FIG. 4, this causes the oil level to rise through aperture 101, through shaft 100, and into cooking pan 14. This occurs at about the same instant that the food product is dispensed into cooking basket 13. Lid 111 of cooking basket 13 is then closed by a basket lid motor controlled by unit 21. The heated oil then rises into pan 14, submerging cooking basket 13. The food product in the basket is then cooked in approximately 10 seconds.

After vent valve 22 has remained closed for approximately 10 seconds, the food product should be fully cooked, and vent valve 22 is opened by control unit 21. As a result, the air pressure in chamber 16 is released and the oil in cooking pan 14 drains back down shaft 100 into chamber 16. Control unit 21 lifts basket 13 out of cooking pan 14 to drain the product of excess oil using counterweight 112 and a basket motor. Control unit 21 then signals the basket motor to tilt forward and dump the cooked food product into a cup ready for the consumer to eat. Any oil consumed by the food product during the cooking process is replenished in two-second bursts by reservoir control valve 18, until TC2 106 is again reached in the manner discussed above.

The apparatus also has a "rest" phase, or low-demand period, as specified by the vendor, wherein the temperature in heating chamber 16 is reduced by control unit 21 to 65° C. When the unit enters this phase, the apparatus signals drain valve 108, situated at the bottom of heating chamber 16, to open thus releasing cooking oil contained therein. Control unit 21 holds valve 108 open until approximately 30% of the oil has drained out. This is accomplished by means of a timer which has been pre-set to the time it takes for valve 108 to release approximately 30% of the oil contained in chamber 16. The oil is then replenished in chamber 16 in the manner discussed above. This procedure removes debris that will result from repeated cookings in the apparatus, and further preserves the oil's overall life, and texture of the product cooked therein.

Referring to FIG. 5, control of the dispensers, air compressor, components of the heating chamber and the oil supply is maintained by control unit 21. Control unit 21 is a microprocessor-based circuit comprising three printed circuit boards having three distinct functions. These boards include: the Central Processing Unit (CPU) card 200; an interface card 201; and a temperature control and oil refill (temp control) card 202. Each of the boards are connected to motherboard 207 which provides interconnections between the boards and the various devices that they communicate with.

CPU card 200 performs all the calculations and processing tasks necessary for the operation of the entire apparatus. The CPU card issues the appropriate commands depending on what point in the vend cycle the apparatus is. CPU card 200 detects when the consumer has inserted his money into coin mechanism 216, via line 325, and selected a product. It regulates a solid state relay control 203, which is connected to bus 300 and can trigger solenoids for oil filling valve 18, oil draining valve 108, air compressor 19, and vent solenoid 22. Solid state relay 203 is connected to CPU card 200 via bus 321 and motherboard 207. CPU card 200 monitors whether a product has been dispensed out one of the bins 11 by switches 62 which, as discussed previously, are triggered when a bin's weight platform 58 (as shown on FIG. 3) is opened. As discussed above, when a switch 62 is triggered, as detected by CPU card 200, the cooking cycle is started. A cooking cycle is started when CPU card 200 closes vent 22 for 10 seconds and activates compressor 19 for 3 seconds, allowing the oil to rise into the cooking chamber thus cooking the product.

CPU card 200 also monitors service module 215 to determine whether the apparatus is in a high-demand or low-demand period. If the unit is in a high demand period, the temperature of the oil, as detected by TC2 106, is kept at the full cooking temperature of 205° C. If the unit is in a low demand or "rest" period, oil temperature is kept at 65° C. The vendor may reprogram control unit 21 by changing service module 215, which is plugged into the control unit, and provides information for these high and low demand periods. Module 215 is connected to the motherboard and the CPU card over bus 322. Module 215 contains a timer which alerts the CPU card when the high and low demand periods are so that it can reduce temperature in heating chamber 16 and/or dump oil, as mentioned above. Module 215 also contains a 16 character alphanumeric display which alerts the service personnel of the current status of the machine.

CPU card 200 communicates with interface card 201 via motherboard 207 and thereby controls certain functions of the apparatus. Interface card 201 controls the motors for the cooking basket 220, cooking basket lid 222, basket lid transducer 224, and basket position transducer 223 via bus 302 and motherboard 207. Interface card 201 also controls motors 56 for each dispenser 11 on each bin via bus 300. Electro-magnets 64 are also controlled by interface card 201 over bus 303.

Interface card 201 contains digital to analog convertors for monitoring and controlling various analog devices in the apparatus. When a "vend" is detected by CPU card 200, it then instructs interface card 201 to dispense product by activating one of the dispenser motors 56, and the requisite electromagnet 64 for holding open one of the dispenser doors. Interface card 201 also lowers basket 13 into pan 14 as shown on FIGS. 1 and 4, using basket motor 220. Basket lid motor 222 is activated to close the lid when CPU card 200 detects that a cooking cycle has started by the triggering of a switch 62 from one of the dispensers. The basket motor 220 is again activated when the cooking cycle is complete, after air compressor 19 has ceased pumping, and vent valve solenoid 22 has been released. The control unit 21 signals basket motor 220 to lift basket 13 out of the cooking pan 14, and drains the product for a brief period of time. Lid 111 is reopened by basket lid motor 222, so that the basket can then be tilted by basket motor 220, thereby dumping the cooked product into an awaiting cup, ready for the consumer to eat. All of these operations are monitored using basket position transducer 223, and basket lid transducer 224 as position feedback to interface card 201 on bus 302, which in turn provides information to CPU card 200.

CPU card 200 also communicates with temp control card 202 via motherboard 207 to control oil temperature and level. Temp control card 202 controls operation of heating coils 103 over bus 300. Temp control card 202 also checks oil level and temperature by monitoring oil float 104 over bus 302, and thermocouples TC1 105, TC2 106, and TC3 107 over lines 310, 312, and 311 respectively.

Temp control card 202 regulates and monitors oil temperature and oil level in heating chamber 16 as shown on FIGS. 1 and 4. It receives commands from CPU card 200 via motherboard 207. Oil temperature and level information is received from the three thermocouples TC1 105, TC2 106 and TC3 107 and minimum level float 104. As discussed above, during the oil heating chamber filling process, the triggering of minimum level float 104 signals temp control card 202 to activate heating coils 103. Heating coils 103 are controlled by CPU card 200 by the transmission of signals to TRIAC drive circuit 230 over line 320. TRIAC drive circuit 230 is connected, in turn, to heating coils 103 over bus 300.

During the filling of heating chamber 16, oil continues filling by opening valve 18 until TC1 105 is reached by the heated oil. Valve 18 is closed until TC1 105 detects that the oil has reached the operating temperature of 205° C., as pre-set by the vendor. Oil is again added into chamber 16 by opening valve 18 until TC2 106 detects that the oil has reached normal level. TC3 107 is the overfill thermocouple. If TC3 107 detects that heated oil has reached it, then valve 108 is opened briefly, releasing a small amount of oil out of heating chamber 16. However, if TC3 107 detects that it has been reached by heated oil in two "vend" cycles in a 20 minute period, then CPU card 200 signals temp control card 202 to shut down heating coils 103, open drain solenoid 108, and prevent coin mechanism 216 from initiating any more "vend" cycles for a predetermined period of time. After a "vend" cycle, valve 18 is opened by CPU card 200 in two second bursts until the heated oil again reaches TC2 106.

To prevent an overtemperature condition, if the temperature inside chamber 16 exceeds 205° C., as detected by TC1 105 then heating coils 103 are shut down and the machine is prevented from initiating any more "vend" cycles in the manner discussed above. As an additional overtemperature precaution, bus 300, which provides AC current to heating coils 103, is interrupted by two capillary bulb disconnect switches 109 and 110. Switches 109 and 110 are wired in series with bus 300 and are normally closed. They will open thereby disconnecting the AC current if the oil temperature inside the heating chamber exceeds 430° F. for a predetermined period of time. The machine will then resume operation if an automatic switch 109 is triggered, since it will reset approximately 15 minutes after triggering. On the other hand, if manual switch 110 has triggered then service to the machine will then be necessary to reset it and make the machine operational again.

Thus, an invention for dispensing and cooking a plurality of food products has been described.

What is claimed is:

1. An apparatus for dispensing food products from a bin to a first area, the bin being connected to the first area through an opening, the apparatus comprising:

a paddle wheel assembly rotatably mounted within said bin, said assembly having a plurality of spaced-apart flanges radiating out from a center axis for guiding said food products through the opening, said flanges being comprised of a pliable material;

a flapper member attached to the interior of said bin relative to said paddle wheel assembly such that when said paddle wheel assembly is rotated said flapper member forces one of said flanges towards an adjacent flange thereby orienting and holding said food products between said flanges to reduce breakage of said food products as the food products are guided through the opening into the first area; and a means for rotating said paddle wheel assembly.

2. The apparatus of claim 1 wherein said flanges are comprised of rubber or plastic.

3. The apparatus of claim 1 wherein said flapper is comprised of a pliable material.

4. The apparatus of claim 1 wherein said flapper is comprised of rubber or plastic.

5. The apparatus of claim 1 wherein the first area comprises a chamber for receiving said food products from said paddle wheel assembly.

6. The apparatus of claim 5 wherein said chamber comprises:

a platform for releasing said food products;

a means for opening said platform when said chamber is filled with a predetermined amount of said food products; and a means for holding said platform open for a first period of time.

7. The apparatus of claim 6 wherein said opening means comprises a hinged counterweight coupled to one end of said platform.

8. The apparatus of claim 6 further comprising a means for detecting when said platform is opened, said detecting means transmitting a signal which activates a cooking sequence to cook said food products.

9. The apparatus of claim 6 wherein the holding means comprises an electromagnet.

10. The apparatus of claim 9 wherein the electromagnet is operative upon opening of the platform.

11. The apparatus of claim 8 wherein the detecting means comprises a switch operatively coupled to the platform.

12. The apparatus of claim 1 wherein said means for rotating comprises a motor.

13. The apparatus of claim 1 wherein said food product comprises a dehydrated food substance formed in the shape of a chip.

14. An apparatus for dispensing food products from a bin to a first area, said bin having a storage chamber and a dispensing chamber, said storage chamber coupled to said dispensing chamber by an aperture, the apparatus comprising:

a paddle wheel assembly rotatably mounted within said dispensing chamber, said assembly having a plurality of spaced-apart flanges radiating out from a central axis adjacent pairs of said flanges forming a compartment within said dispensing chamber for receiving a certain quantity of said food products through said aperture said flanges being comprised of a pliable material;

a flapper member attached to an interior wall of said dispensing chamber relative to said paddle wheel assembly such that when said paddle wheel assembly is rotated said flapper member forces one of said adjacent pairs of said flanges towards the other one of said adjacent pairs, the rotation of said paddle wheel against said flapper member reducing the volume within said compartment, thereby orienting and holding said certain quantity of said food products thus reducing breakage of said food product; and a means for rotating said paddle wheel assembly.

15. The apparatus of claim 14 wherein said food products comprise a dehydrated food substance formed in the shape of a chip.

* * * * *